United States Patent
Kurita et al.

(10) Patent No.: US 7,630,160 B2
(45) Date of Patent: Dec. 8, 2009

(54) MAGNETIC DISK DRIVE, PREAMPLIFIER FOR MAGNETIC DISK DRIVE, FLEXIBLE PRINTED CABLE ASSEMBLY FOR MAGNETIC DISK DRIVE

(75) Inventors: Masayuki Kurita, Kanagawa (JP); Masashi Murai, Kanagawa (JP); Hideaki Tanaka, Kanagawa (JP); Noriaki Satoh, Kanagawa (JP); Hiroshi Fukuda, London (GB); Tsukasa Fujimori, Tokyo (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 19 days.

(21) Appl. No.: 12/006,683

(22) Filed: Jan. 4, 2008

(65) Prior Publication Data

US 2008/0273262 A1 Nov. 6, 2008

(30) Foreign Application Priority Data

May 1, 2007 (JP) .............................. 2007-000632

(51) Int. Cl.
*G11B 15/18* (2006.01)
*G11B 33/14* (2006.01)

(52) U.S. Cl. ..................... 360/69; 360/97.02; 360/245.9

(58) Field of Classification Search ........................ None
See application file for complete search history.

(56) References Cited

U.S. PATENT DOCUMENTS 5,500,065 A * 3/1996 Koch et al. ................... 156/123
5,825,581 A * 10/1998 Morita et al. ............ 360/78.04
7,079,348 B2 * 7/2006 Ishii et al. ...................... 360/75
7,154,700 B1 * 12/2006 Schreck et al. ............ 360/77.04
7,349,169 B2 * 3/2008 Lee et al. ........................ 360/69
7,457,073 B2 * 11/2008 Kurita et al. ................... 360/75
7,486,465 B2 * 2/2009 Kondo ............................ 360/75
2006/0119974 A1 6/2006 Yamazaki et al.
2008/0068742 A1 * 3/2008 Kasajima ................. 360/77.03
2008/0192379 A1 * 8/2008 Kurita et al. ................... 360/75
2008/0247078 A1 * 10/2008 Yao et al. ........................ 360/75

FOREIGN PATENT DOCUMENTS

JP 2008076053 A * 4/2008

* cited by examiner

*Primary Examiner*—K. Wong
(74) *Attorney, Agent, or Firm*—Townsend and Townsend and Crew LLP; John Henkhaus

(57) ABSTRACT

Embodiments of the present invention help to improve the cost, mountability, and reliability of a magnetic disk drive that regulates a fly height of a magnetic head slider correspondingly to the operating altitude of the drive by using an air pressure sensor and a heater. According to one embodiment, a preamplifier is a semiconductor chip formed by three-dimensionally laminating thin film circuits on a bulk silicon wafer. An air pressure sensor is integrally formed on the semiconductor chip through a semiconductor process. The air pressure sensor is configured to include an isolating cavity, a diaphragm that deflecting in response to a change in a pressure difference between the isolating cavity and the outside, and lower and upper electrodes and for detecting variation in electrostatic capacitance. The preamplifier including the air pressure sensor integrally formed therein is attached to a flexible printed cable (FPC) to oppose the FPC. A through-hole is provided in a portion opposite the air pressure sensor of the FPC to introduce air pressure in an operating environment into a diaphragm of the air pressure sensor.

17 Claims, 10 Drawing Sheets 5f  5c  5e 7g  7h  7i  7j

| | HEAD-2 POWER TABLE | | | | |
| | HEAD-1 POWER TABLE | | | | |
| HEAD-0 POWER TABLE ||||||
| TEMPERATURE | OPERATION MODE | ZONE 0 | ZONE 1 | ... |
| --- | --- | --- | --- | --- |
| TEMPERATURE ZONE 0 | RECORDING | P0w0 | P0w1 | ... |
| | PLAYBACK | P0r0 | P0r1 | ... |
| TEMPERATURE ZONE 1 | RECORDING | P1w0 | P1w1 | ... |
| | PLAYBACK | P1r0 | P1r1 | ... |
| ⋮ | ⋮ | ⋮ | ⋮ | ... |

MAGNETIC DISK DRIVE, PREAMPLIFIER FOR MAGNETIC DISK DRIVE, FLEXIBLE PRINTED CABLE ASSEMBLY FOR MAGNETIC DISK DRIVE

CROSS-REFERENCE TO RELATED APPLICATION

The instant nonprovisional patent application claims priority to Japanese Patent Application No. 2007-000632 filed Jan. 5, 2007 and which is incorporated by reference in its entirety herein for all purposes.

BACKGROUND OF THE INVENTION

In recent years, magnetic disk drives (HDDs) have been widely used not only with computer devices but also with household electric appliances, such as video recorders. Such a magnetic disk drive includes a magnetic disk and a magnetic head slider. While flying over the magnetic disk, the magnetic head slider magnetizes the magnetic disk or reads a magnetized state of the magnetic disk and thereby executes recording or playback of information, for example, in writing information, as the distance between the magnetic disk medium and the magnetic head slider becomes narrower, expansion of a magnetic filed formed by the magnetic head can be reduced to the smaller, whereby the area size to be magnetized on the magnetic disk drive, the distance between the magnetic disk medium and the magnetic head, that is, the fly height of the magnetic head slider is south to be reduced.

As one of conventional techniques for reducing the fly height of the magnetic head slider, a technique is known in which a heater formed from a thin film resistor or the like is mounted in the vicinity of a recording/playback element. A part of the magnetic head slider is heated and thermally expanded to thereby bring the recording/playback element to be close to the side of the magnetic disk. In this case, the fly height of the magnetic head slider varies depending upon any one of operating conditions, such as operating environment temperature, operating environment pressure, zone of a magnetic disk medium targeted for recording/playback, and operation modes such as recording and playback modes. As such, the amount of heating of the heater has to be control corresponding to the respective operating condition.

To deal with the operating environment temperature, currently available magnetic disk drives include a type including a temperature sensor and hence capable of measuring the temperature by using the temperature sensor. Japanese Patent Publication No. 2006-164388 discloses a method of determining the amount of application power to the heater corresponding to the operating environment temperature by using output information received from a temperature sensor such as described above.

Pressure (air pressure) varies corresponding to the altitude at which a magnetic disk drive is used, whereby the fly height of a magnetic head slider being lifted by the power of air is varied. A similar phenomenon takes place even in a spacing, such as the interior of an aircraft, which is hermetically enclosed by a pressure different from the standard atmospheric pressure, irrespective of the altitude. While general types of presently commercially available magnetic disk drives do not include an air pressure sensor, various absolute-pressure dedicated types of air pressure sensors are commercially available. In a magnetic disk drive using such air pressure sensor, output information from the air pressure sensor can be utilized to control the power for application to the heater, thereby making possible the appropriate maintenance of the fly height of the magnetic head slider.

In this case, an important issue is how to mount the air pressure sensor in the magnetic disk drive. Simple assembly of the existing air pressure sensor into the drive requires an additional spacing for accommodating the sensor. Further, costs for the sensor itself and mounting it increase the cost of the overall magnetic disk drive. Further, a final configuration of the magnetic disk drive inevitably become more complex than that in the existing configuration, consequently increasing concern in reliability over causes of failure, for example.

BRIEF SUMMARY OF THE INVENTION

Embodiments in accordance with the present invention help to improve the cost, mountability, and reliability of a magnetic disk drive that regulates a fly height of a magnetic head slider correspondingly to the operating altitude of the drive by using an air pressure sensor and a heater. According to the particular embodiment disclosed in FIG. 1, a preamplifier 7 is a semiconductor chip formed by three-dimensionally laminating thin film circuits on a bulk silicon wafer 7a. An air pressure sensor 7f is integrally formed on the semiconductor chip through a semiconductor process. The air pressure sensor 7f is configured to include an isolating cavity 7g, a diaphragm 7h that deflecting in response to a change in a pressure difference between the isolating cavity 7g and the outside, and lower and upper electrodes 7i and 7j for detecting variation in electrostatic capacitance. The preamplifier 7 including the air pressure sensor 7f integrally formed therein is attached to a flexible printed cable (FPC) 6 to oppose the FPC 6. A through-hole 6f is provided in a portion opposite the air pressure sensor 7f of the FPC 6 to introduce air pressure in an operating environment into a diaphragm 7h of the air pressure sensor 7f.

DETAILED DESCRIPTION OF THE INVENTION

Figure 1:
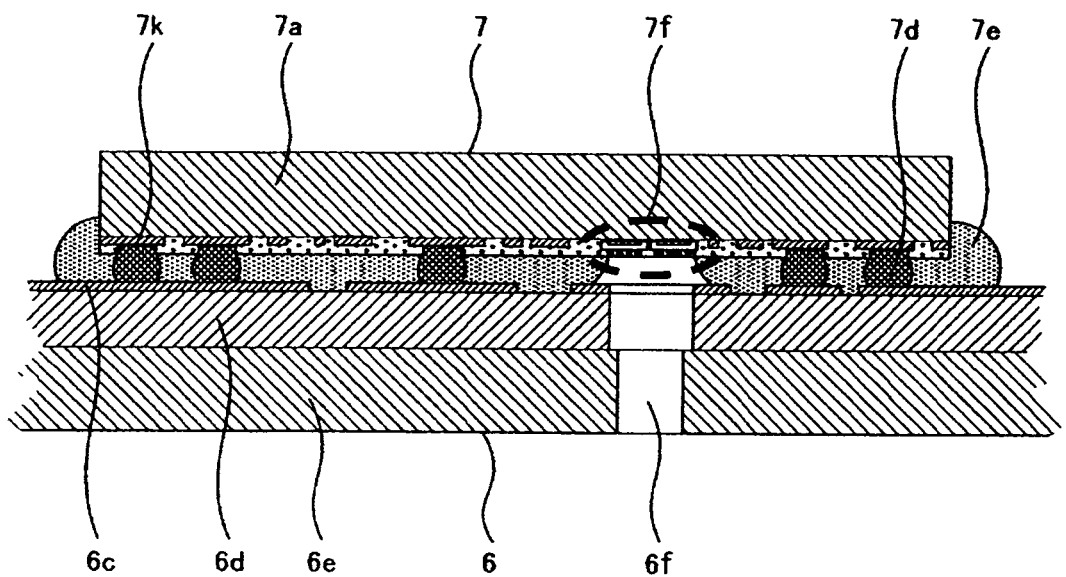
FIG. 1 is a cross sectional view of an assembly of a preamplifier and a flexible printed cable in accordance with an embodiment.

Embodiments of the present invention relate to a magnetic disk drive in which a part of a magnetic head slider is heated by a heater to control a distance (fly height) from a magnetic disk medium to a magnetic head, thereby to improve recording and playback performances.

Embodiments of the present invention are made in view of situations such as described above, and hence an object of embodiments of the invention is to mount a function of an air pressure sensor in a magnetic disk drive by minimizing concerns in, for example, cost increases and reliability.

In order to solve the problems, a magnetic disk drive in accordance with embodiments of the present invention includes a magnetic disk medium; a magnetic head slider including a recording element for recording magnetic information onto the magnetic disk medium, a playback element for playing back magnetic information from the magnetic disk medium., and a heater for regulating a distance between each of the recording and playback elements and the magnetic disk ; a carriage assembly for supporting the magnetic head slider and for moving the magnetic disk medium along a radial direction of the magnetic disk medium; and a preamplifier that amplifies and supplies a recording signal to the recording element, that amplifies a playback signal of the playback element, and that supplies a current to the heater, the magnetic disk drive being characterized in that the preamplifier includes an air pressure sensor integrally formed with the preamplifier, and regulates an electricity supply amount for the heater in accordance with an output of the air pressure sensor.

The air pressure sensor includes a lower electrode, a diaphragm including an upper electrode formed therein, and an isolated cavity between the lower electrode and the diaphragm.

A preamplifier for a magnetic disk drive, in accordance with embodiments of the present invention has an air pressure sensor integrally formed with the preamplifier. The preamplifier is characterized by including a write driver for amplifying and supplying a recording signal to a magnetic recording element; a read amplifier for inputting and amplifying a playback signal of a magnetic playback element; a selector that inputs an output signal of the write driver, a playback signal of the magnetic playback element, and an output signal of the air pressure sensor and that selects and outputs any one of the input signals; and an analog-digital converter that converts an analog signal to a digital signal and that outputs the digital signal.

A flexible printed cable assembly for a magnetic disk drive, in accordance with embodiments of the present invention is characterized by including a flexible printed cable including a terminal portion connected to wirelines to which lead wires of a magnetic recording element, a magnetic playback element, and a heater that are mounted in a magnetic head slider; and a preamplifier wherein an air pressure sensor is integrally formed with the preamplifier, and a plane wherein the air pressure sensor of the preamplifier is formed is attached to the flexible printed cable.

The flexible printed cable includes a through-hole in a portion opposite the air pressure sensor.

Alternatively, the flexible printed cable may include a groove for introducing an external air pressure to the air pressure sensor.

Alternatively, the preamplifier may include a through-hole communicating to the air pressure sensor.

Alternatively, the preamplifier may include a groove for introducing an external air pressure to the air pressure sensor.

According to embodiments of the present invention, the function of the air pressure sensor can be mounted in the magnetic disk drive by minimizing concerns in, for example, cost increases and reliability.

Overall Configuration

Figure 2:
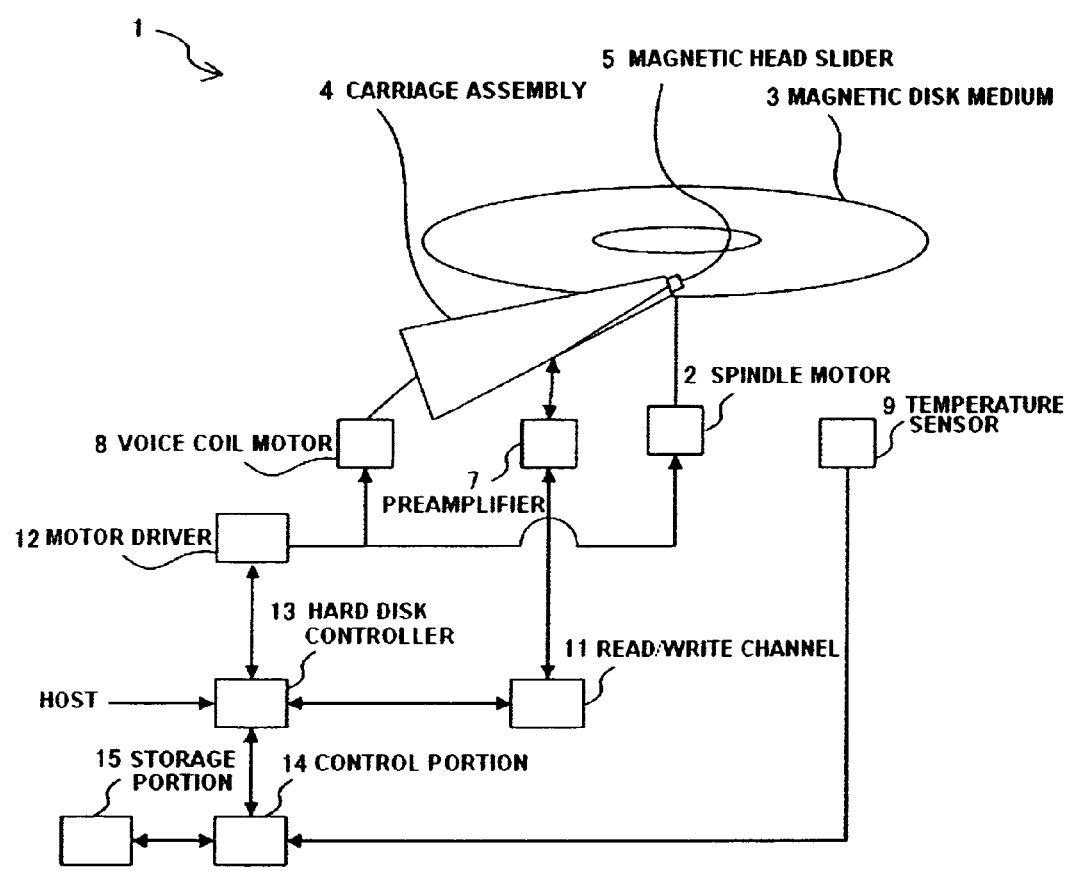
FIG. 2 is a block diagram showing an example of the configuration of a magnetic disk drive in accordance with an embodiment of the present invention.
Figure 3:
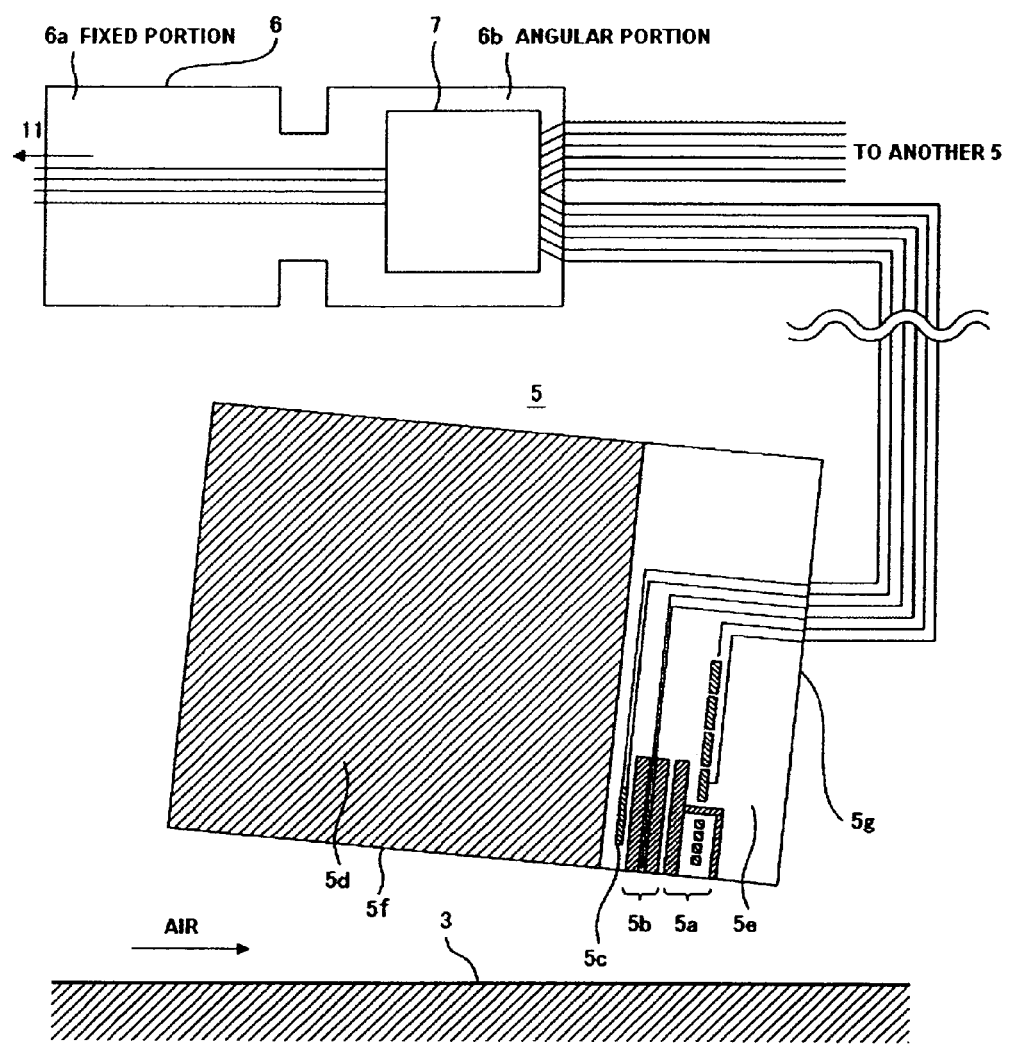
FIG. 3 shows a configuration view of a part of the magnetic disk drive and a cross sectional view a magnetic head slider.

FIG. 2 is a block diagram of the whole of or overall configuration of a magnetic disk drive in accordance with embodiments of the present invention, and FIG. 3 is a configuration diagram of a part of the magnetic disk drive and a cross sectional view of a magnetic head slider. A magnetic disk drive 1 is configured including a spindle motor 2, a magnetic disk medium 3, a carriage assembly 4, a magnetic head slider 5, a preamplifier 7, a voice coil motor 8, a temperature sensor 9, a read/write channel 11, a motor driver 12, a hard disk controller 13 (HDC), a control portion 14, and a storage portion 15.

The spindle motor 2 rotates holding one or a plurality of magnetic disk mediums 3. The carriage assembly 4 is rotated by the voice coil motor 8, thereby to relatively move the magnetic head slider 5, which is attached to a leading edge portion of the carriage assembly 4, along a radial direction on the magnetic disk medium 3. With reference to FIG. 3, the magnetic head slider 5 has an air bearing surface, and is lifted on the magnetic disk medium 3 by air pressure. The magnetic head slider 5 includes in its interior a recording element 5a for magnetically recording data onto the magnetic disk medium 3 and a playback element 5b for playing back recorded data. Further, the magnetic head slider 5 includes, in the vicinity of the recording and playback elements, a heater 5c for regulating a distance (fly height) between the recording/playback element and the magnetic disk medium by utilizing thermal expansion.

Upon receipt of an input signal indicative of record information, the preamplifier 7 amplifies and supplies the signal to the recording element 5a of the magnetic head slider 5. Further, the preamplifier 7 amplifies and outputs a playback signal output from the playback element 5b. Further, upon receipt of an input of a specification of an amount of current for output to the heater 5c, the preamplifier 7 supplies the specified amount of current (or voltage or power) to the heater 5c.

Figure 4:
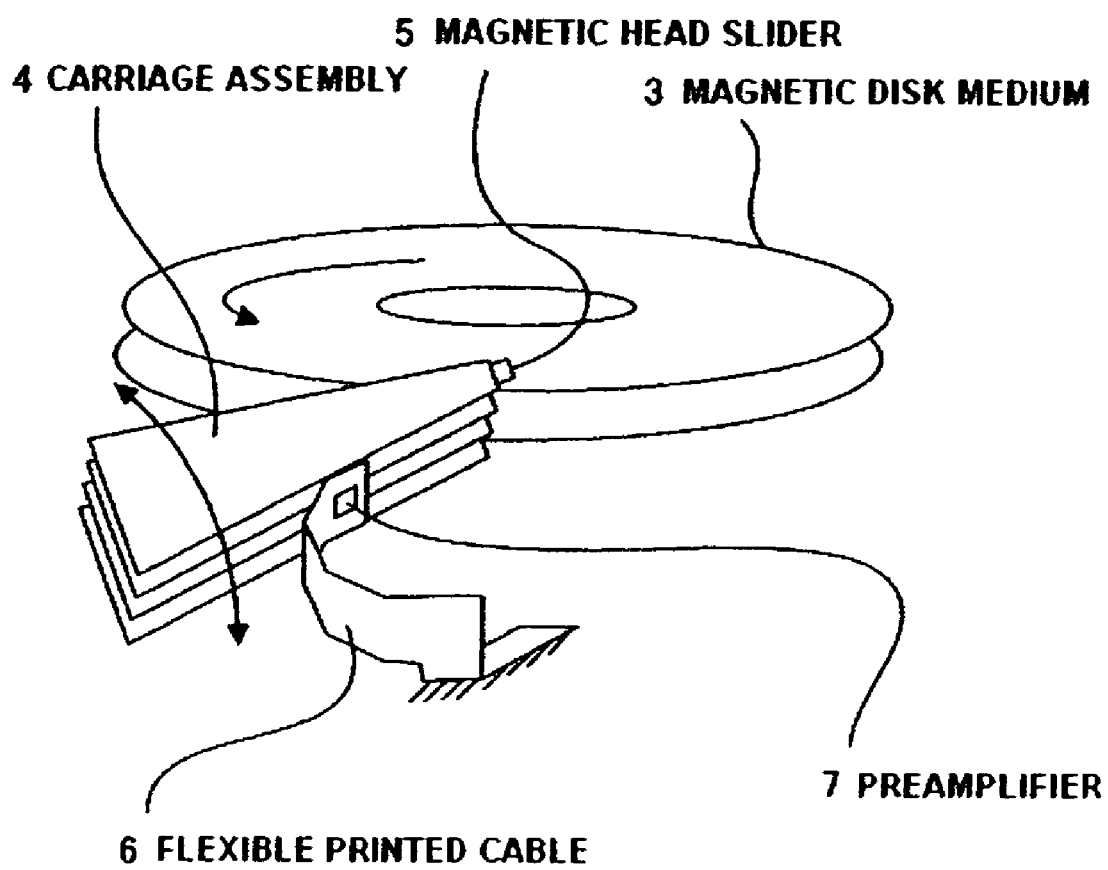
FIG. 4 is a schematic view of the magnetic disk drive, showing a mounting position of the preamplifier.

In a midway of a path electrically connecting together the magnetic head slider 5 and the read/write channel 11, there is a provided a "flexible printed cable" 6 (FPC) formed of a flexible wireline that absorbs the rotational motion by the voice coil motor 8 as deflection. With reference to FIG. 4, the flexible printed cable 6 is such that one end thereof is fixedly secured to a housing, a terminal portion thereof is connected to a connector for communication to the outside of the housing, and the other end thereof is connected to the carriage assembly 4 to be capable of performing rotational motion. As shown in FIG. 3, the terminal portion is connected to wirelines connected to lead wires of the recording element 5a, playback element 5b, and heater 5c. The preamplifier 7 is attached onto the flexible printed cable 6 in a manner such as soldering. In the state shown in FIGS. 3 and 4, the preamplifier 7 is disposed in a movable portion 6b of the flexible printed cable 6 that moves with the carriage assembly; however, the preamplifier 7 may be disposed in a fixed portion 6a of the flexible printed cable 6.

Referring back to FIG. 2, the temperature sensor 9 detects an environmental temperature in the vicinity the magnetic head slider 5, and outputs an analog signal indicative of the detected temperature. The temperature sensor 9 may be disposed on the flexible printed cable 6, for example. Alternatively, similarly as the HDC 13 and the control portion 14, the temperature sensor 9 may be disposed on a base board (card).

The read/write channel 11 outputs to the preamplifier 7 a signal formed by code modulation of recording-targeted data. Further, the read/write channel 11 demodulates a playback signal output from the preamplifier 7, and outputs to the HDC 13 data obtained by code demodulation of the playback signal output from the preamplifier 7.

The motor driver 12 outputs a driving current to, for example, the spindle motor 2 or the voice coil motor 8 in accordance with a specification input from the control portion 14, thereby to operate the spindle motor 2 or the voice coil motor 8.

The HDC 13 receives, for example, recording-targeted data or command transferred from an external host, or transfers playback data output from the read/write channel 11 to the host.

The control portion 14 controls a respective portion, such as control of the motor driver 12, to perform position control of the magnetic head slider 5. The control portion 14 is a program control device, such as a microcomputer, and operates in accordance with self-contained programs and/or programs stored in the storage portion 15. According to the present embodiment, the control portion 14 provides to the preamplifier 7 the specification of the amount of current for supply to the heater 5c. Operation information and the like information of the control portion 14 will be described below.

The storage portion 15 contains, for example, programs for execution by the control portion 14 and data necessary for execution of the programs. The storage portion 15 further contains values (control parameters) that the control portion 14 references when controlling the heater 5c. Examples of the control parameters will be described below. The storage portion 15 is a nonvolatile memory, such as an EEPROM (electrically erasable programmable read only memory). Alternatively, the storage portion 15 may be a partial area of the magnetic disk medium 3. In this case, in manufacture, the control parameters are stored in the magnetic disk medium 3; and in use, after power-on the control parameters are first copied into a memory accessible at high speed from the magnetic disk medium 3, and are then referenced in control of the heater 5c.

Forming Process for Slider and Heater

A general forming process for the magnetic head slider 5 will be described hereinbelow with reference to FIG. 3. To begin with, large numbers of, for example, recording elements 5a, playback elements 5b, heaters 5c, and wirelines connecting thereto are laminated by a thin-film process on a wafer 5d of an alumina-titanium-carbide sintered compact ("AlTiC," hereinbelow). Then, the structure in the wafer state is cut and separated by dicing into a bar state, and is further cut and separated into discrete or respective sliders. Before or after the process, an air bearing surface 5f in the bar or slider state is polished to be smooth, thereby to form a carbon protection film. Further, a step bearing in a shape for effectively generating air pressure is formed on the air bearing surface 5f.

Figure 5:
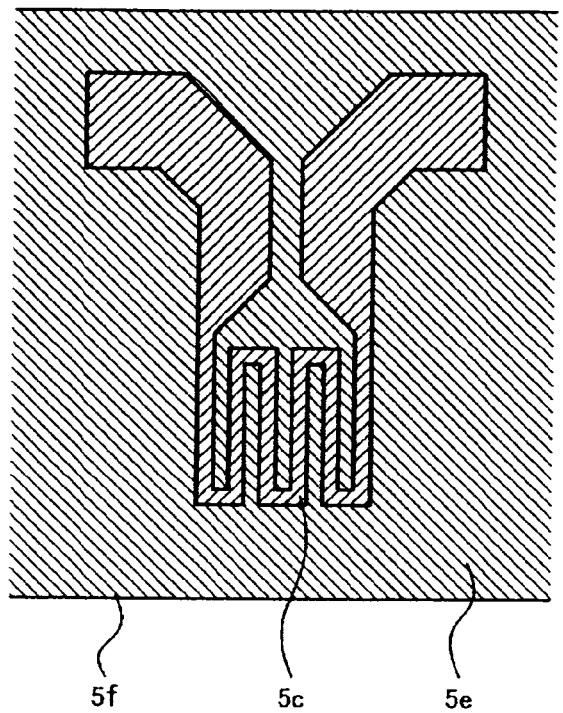
FIG. 5 is view of a heater as viewed from the side of air outflow end face.

FIG. 5 shows a cross sectional view of a layer of the heater 5c as viewed from the side of an air outflow end face 5g. A material of the heater 5c is an electrically conductive thin film of a material such as a nickel-chrome alloy, having a relatively high resistance value. After a uniform film is formed by sputtering or the like manner, an unnecessary portion is removed by milling or the like manner, whereby a profile as shown in FIG. 5 is formed. The removed portion is covered by an insulation film 5e of, for example, alumina. In the present embodiment shown in FIG. 3, the heater 5c is disposed between the AlTiC portion 5d and the playback element 5b; however, the heater 5c may be in a different portion as long as the fly height of the recording/playback element can be effectively controlled by utilizing thermal expansion. For example, the heater 5c may be disposed between the recording element 5a and the playback element 5b. A resistance value of, for example, 100Ω, can be realized if appropriate design is carried out for the thickness of the electrically conductive film and the ratio between the length and width of a thin line of a meandering portion.

Construction of Preamplifier

Figure 6:
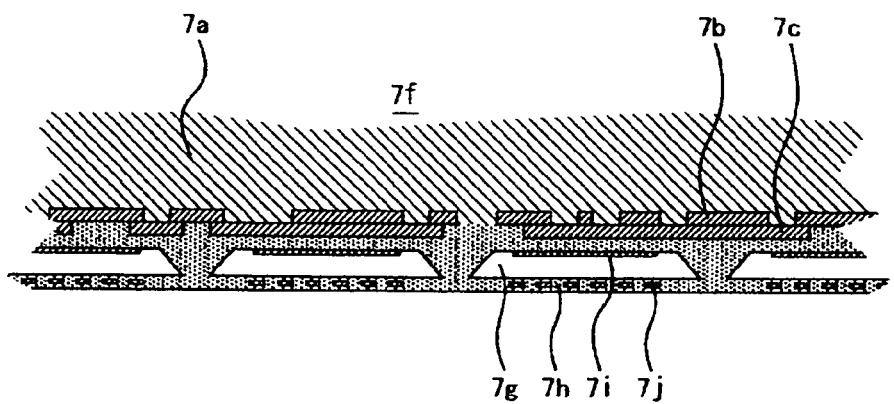
FIG. 6 is an enlarged cross sectional view of a peripheral portion of the preamplifier according to an embodiment of the present invention.

The construction of a peripheral portion of the preamplifier 7 will be described hereinbelow with reference to FIGS. 1 and 6. The preamplifier 7 is formed in the manner that thin film circuits called a device layer 7b and a metal layer 7c are three-dimensionally laminated on a bulk silicon wafer 7a, and finally is formed as a semiconductor chip covered by a protection film, except for an electrode portion 7k. However, FIG. 1 is rendered such that the lamination direction in the wafer step is downward. A bump 7d of a solder material is formed to connect between the exposed electrode portion 7k and a wireline exposure portion 6c of the flexible printed cable 6. An interface is filled with a resin underfill 7e that increases reinforces physical connection integrity between the preamplifier 7 and the flexible printed cable 6 and that protects electrically connected portions.

In FIG. 1, a portion enclosed by an ellipsoidal broken line is a pressure sensing portion 7f (or, air pressure sensor) that provides an air pressure sensor function. FIG. 6 is an enlarged view of the pressure sensing portion 7f. FIG. 6 also is shown in which the lamination direction is downward. Components are formed on the portion where the preamplifier is formed (downwardly or in lower portions in FIG. 6—which is the same herebelow). The components include isolating cavities 7g each for measuring air pressure, diaphragms 7h that each deform in response to a change in the pressure difference or variance between the isolating cavity and the outside, and lower electrodes 7i and upper electrodes 7j for each detecting the change in electrostatic capacitance. Not a single, a plurality of diaphragm structures are arranged in the form of an array to realize a desired electrostatic capacitance, whereby sensitivity is improved. The pressure sensing portion 7f need not be indispensably formed on the preamplifier, but may be formed aside therefrom (above a portion where the preamplifier circuit is not present). In this case, however, the overall footprint of the preamplifier 7 is enlarged.

As shown in FIG. 1, the pressure sensing portion 7f is provided not on the side of the substrate of the preamplifier 7, but it is provided on the device side. More specifically, the pressure sensing portion 7f is provided on the side opposing the flexible printed cable 6. As such, a mechanism for guiding or introducing the pneumatic pressure in an operating environment to the diaphragms 7h is necessary. In the present embodiment, a through-hole 6f is provided in a portion of the flexible printed cable 6 opposing the pressure sensing portion 7f. Air introduced into the interior of the drive's housing through an air filter from the outside of the magnetic disk 1 further passes through the through-hole 6f and reaches the vicinity of the pressure sensing portion 7f. A change of pressure is detected through deformation of the diaphragm 7h.

Circuit Configuration of Preamplifier

Figure 7:
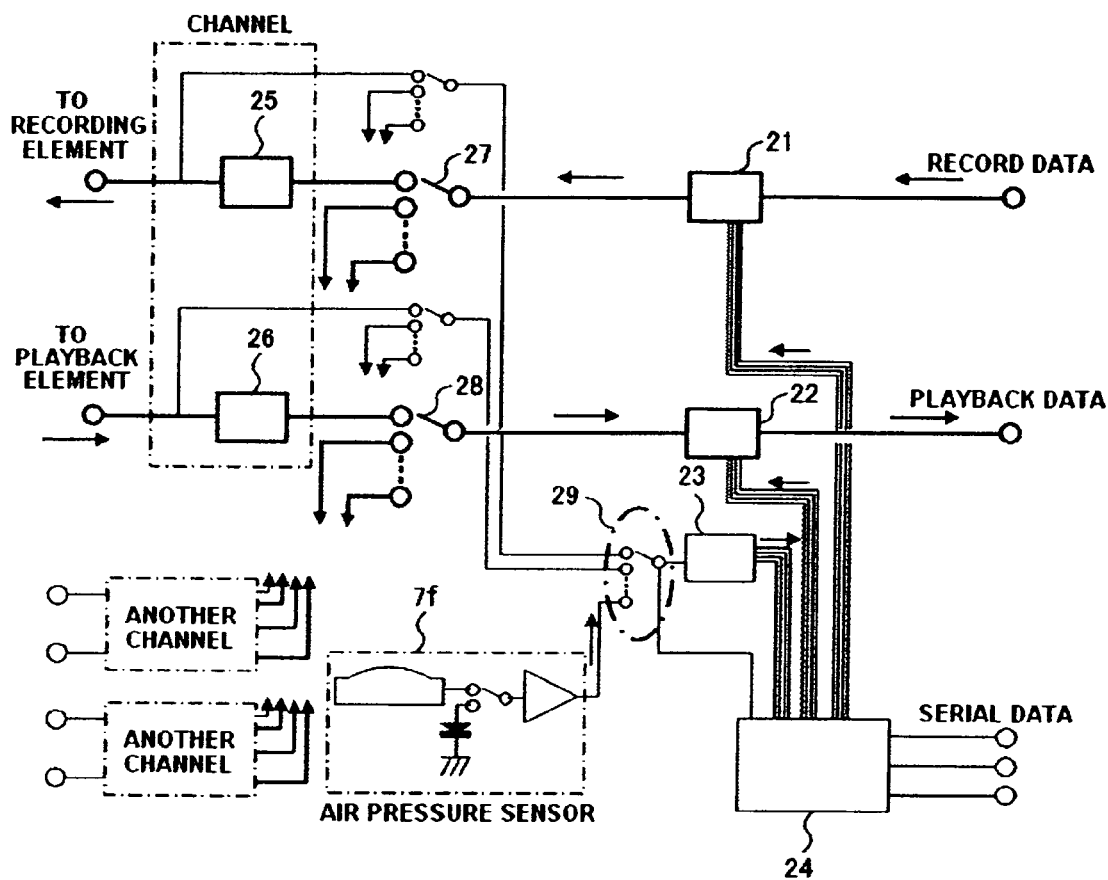
FIG. 7 is a circuit diagram of the preamplifier according to an embodiment of the present invention.
Figure 8A:
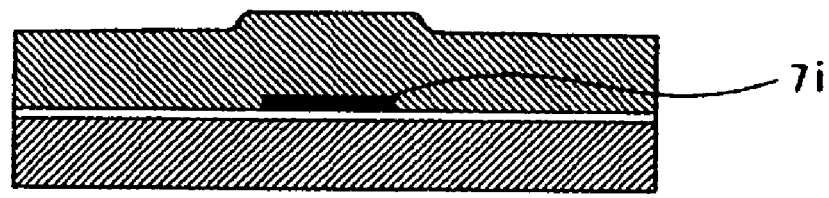
FIGS. 8(a)-8(d) are views showing a manufacturing process of an air pressure sensor according to an embodiment of the present invention.
Figure 8B:
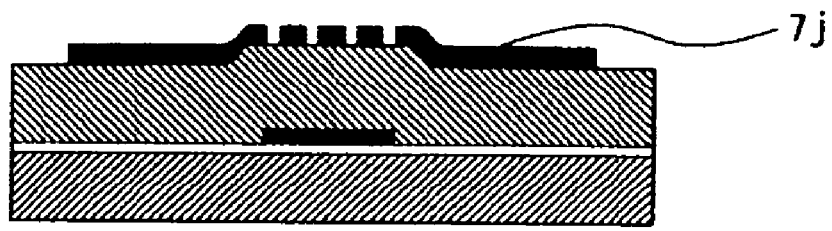
Figure 8C:
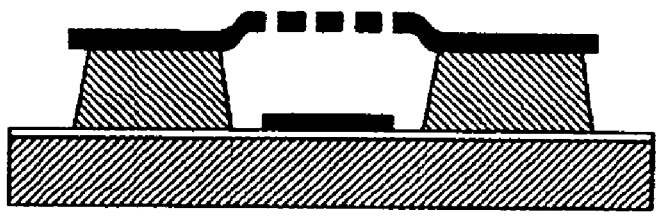
Figure 8D:
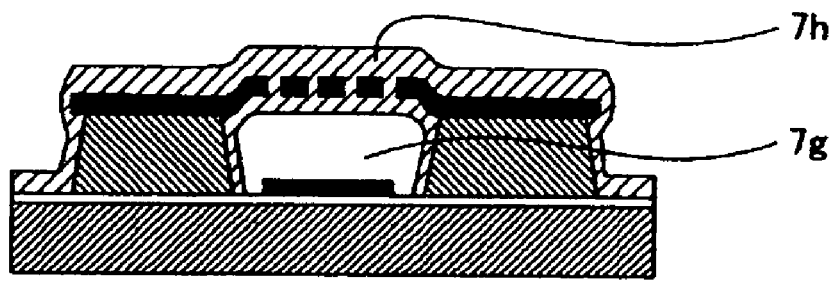

FIG. 7 shows a circuit configuration in the interior of the preamplifier 7. Record data is input into the recording element 5a from the read/write channel 11 via a predriver write DAC (digital-analog converter) 21, a channel selector 27, and a write driver 25. Playback data is output from the playback element 5b to the read/write channel 11 via a read amplifier 26, a channel selector 28, and a gain control bias ADC (=analog-digital converter) 22. Although, similar as the write driver 25 for the recording element 5a, a circuit for supply current to the heater 5c is present, such a circuit is not shown in FIG. 7. The preamplifier 7 further contains in its interior an analog-digital converter 23 (ADC) a control portion 24, and an ADC function selector 29. The ADC function selector 29 inputs an output signal (analog signal) of the write driver 25 and an analog signal output from the newly added pressure sensing portion 7f and selects and outputs one of the signals to the ADC 23. ADC 23 converts the input analog signal to a digital signal and outputs the digital signal to the control circuit 24. The control circuit 24 converts the digital signal from ADC 23 to serial data, and sends the data to the read/write channel 11. The converted digital signal converted from the output signal of the write driver 25 or the converted digital signal converted from playback signal received from the playback element 5b is used in the control portion 14 to check whether the signal has an appropriate signal level. The converted digital signal converted from the analog signal output from the air pressure sensor 7f is used in the control portion 14 to control the electricity supply amount for the heater 5c.

Forming Process for Air Pressure Sensor

A forming process for the Air pressure Sensor 7f will be described hereinbelow with reference to FIG. 8. FIG. 8 depicts a process for film lamination on the silicon wafer 7a, and is reverse to FIGS. 1 and 6 in the upper-lower direction.

After a device layer 7b, metal layer 7c, and insulation layer above the layers are formed, a lower electrode 7i and sacrificial layer are formed (a). Subsequently, an upper electrode 7j is formed. As a material for the electrodes, tungsten is used, for example, microholes are formed in the upper electrode 7j by, for example, ion-milling (b). The sacrificial layer is etched through the microholes, thereby to form cavities therein (c). Finally, the microholes are covered by vapor deposition of, for example, silicon nitride, thereby to form a diaphragm 7h and an isolating cavity 7g. Pressure in the isolating cavity 7g does not vary, so that the diaphragm 7h deforms in response to variation in external pressure, whereby the electrostatic capacitance between the electrodes 7i and 7j is varied. An ambient air pressure can be detected from the variation in the electrostatic capacitance. If, for referencing the electrostatic capacitance, there is formed an isolated cavity that is similar to the isolating cavity 7g, that has a high stiffness with an increased diaphragm, that is less deformable even when the external pressure varies, an pressure measurement accuracy can be increased.

Advantages in integral forming of the air pressure sensor and the preamplifier will be described herebelow.

Various standalone air pressure sensors are commercially available, such that the air pressure can be measured by mounting such an air pressure sensor on the base board (card). In this case, however, a purchase cost of the air pressure sensor and the cost for mounting the sensor on the card are newly incurred, and in addition, a mounting space therefor is newly necessary. Especially, different from the case of a clean environment in the magnetic disk drive, when the air pressure sensor is disposed on the card, it is difficult to mount only a chip and is difficult for the protection of the fragile sensing portion. As such, it is necessary to mount the sensor after being intensively packaged. Consequently, the cost tends to be high, and also the size tends to be increased.

However, the purchase cost and the mounting cost do not occur because the number of components/parts does not increase in the configuration in which the air pressure sensor is integrally formed with the preamplifier 7. As already described above, in the configuration in which the pressure sensing portion 7f is formed on the existing circuit (device layer 7b, metal layer 7c, and so on), the foot print of the chip does not change, such that the number of chips that can be taken from one wafer does not change. Further, since the existing ADC 23 can be shared, there occurs only a slight increase in the preamp production cost. In addition, the number of terminals of the preamplifier with which electrical connection is made via the solder bumps 7d does not change, such that also the mounting cost does not significantly change. Further, while the mechanism, such as the through-hole 6f, for introducing air to the vicinity of the pressure sensing portion 7f is necessary for the flexible printed cable 6, a process such as die forming or print forming can be utilized, such that substantially no extra cost is required. Further, since the preamplifier is provided in a clean environment in the magnetic disk drive, it can be used in an unpackaged, bare chip state. Further, if the number of components/parts increased, new reliability problems would be posed, such as deterioration in the mounted portion due to a thermal stress or the like. However, as in the present embodiment including the configuration integrally formed with the preamplifier, the conventional reliability as well can be maintained.

Calibration of Offset

Figures 9, 10:
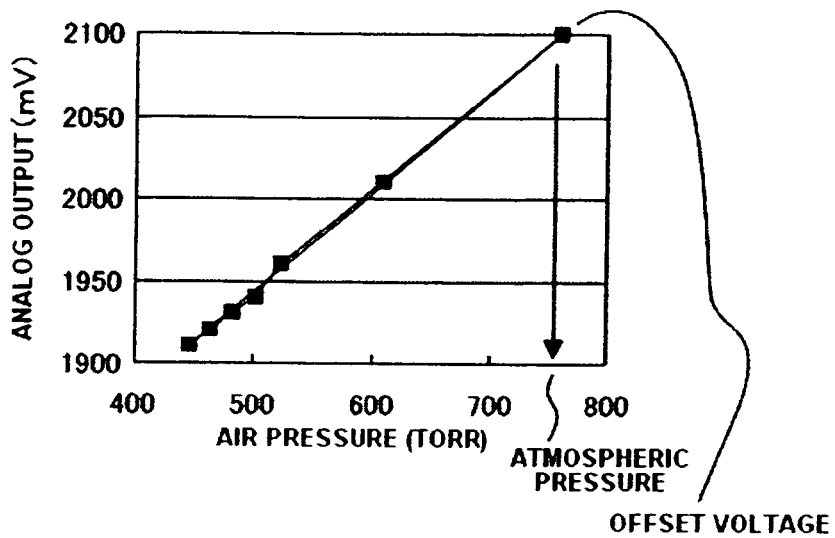
FIG. 9 is a diagram showing output characteristics of the preamplifier of the embodiment.
FIG. 10 is a view showing power tables for the use of controlling heater-actuating electricity supply amounts in the magnetic disk drive.

FIG. 9 shows an example of the analog output produced from the air pressure sensor 7f in accordance with the present embodiment. As can be seen from the drawing figure, some offset outputs are produced even in the atmospheric pressure (altitude, pressure in normal use); and when an operating altitude of the magnetic disk drive drops, the analog output drops.

In a pre-shipment testing process for the magnetic disk drive, the offset output or pressure data after digital conversion can be recorded into the storage portion 15 of the drive. As such, even when variation occurs in the air pressure sensor function of the respective chip occurs, a chip-specific value for the offset output can be known, such that the variation does not cause failure.

The offset output varies also corresponding to the temperature. More specifically, the straight line in FIG. 9 vertically shifts. As such, information received from the temperature sensor 9 is used to compensate for the offset output. In the pre-shipment testing process for the magnetic disk drive, high temperature testing is included, such that also a variation behavior of the offset output corresponding to the temperature can be recorded into the storage portion 15.

Calibration of Sensitivity

Sensitivity (tilt of the straight line in FIG. 9) less varies relative to the offset, such that it does not pose a big problem. As such, calibration thereof is not necessary in many cases. For the variation of the sensitivity, management is carried out in the manner that the preamplifier in a standalone state is put in a vacuum tank, and is provided with a serial number, and the characteristics are recorded, whereby an accurate sensitivity can be known in the operation of the magnetic disk drive. Alternatively, when the preamplifier is put into the vacuum tank after having been assembled into the magnetic disk drive, sensitivity-related information can be obtained.

Backup

Contemplating the case of failure of the air pressure sensor function, one embodiment of the present invention includes a backup function for air pressure measurement. The following describes the backup function. For example, signals of two different wavelengths are recorded in a specific area (reserved area or the like), in which amplitudes of playback signal waveforms of the respective signals are measured and the ratio therebetween is obtained, and resolutions are calculated. The resolution is increased when the distance, from the magnetic disk medium 3 to the magnetic head slider 5, that is, fly height, is reduced. In the case of a playback signal wavelength amplitude of a signal of only one wavelength, the resolution is varied even by a factor other than the fly height. However, the resolution in accordance with the ratio between the playback signal wavelength amplitudes of two wavelengths is less likely to be varied by a factor other than the fly height. In each time of activation of the drive or in each predetermined time interval, it is checked whether the resolution is not unnaturally or unreasonably high. If unreasonably high, then it is determined that the air pressure is low (at a high operating altitude or in an aircraft cabin), and then the fly height is increased, that is, the electricity supply amount for the heater 5c is reduced. In conjunction with the resolution measurement, when an average is taken from a plurality of heads, variation factors other than the air pressure can be avoided, thereby to enable obtaining even higher effectiveness to be obtained. The function is usable not only as the backup function, but also as a function for verification of normal operation of the air pressure sensor. Instead of the resolution, a parameter correlated to the fly height may be used.

Usage of Heater (Air Pressure)

The electricity supply amount for the heater 5c for regulating the fly height is regulated in accordance with the output of the air pressure sensor 7f integrated with the preamplifier 7. More specifically, the step bearing is designed so that, even when there are added other overlapping low fly conditions, such as operating temperature and mode, at a lowest air pressure corresponding to a highest altitude predetermined as a specification (for example, 0.7 atm corresponding to a altitude of 3000 m above sea level), the magnetic head slider 5 does not contact with the magnetic disk medium 3. When the air pressure is determined in accordance with the output of the air pressure sensor 7f to be higher (for example, 1.0 atm corresponding to a altitude of 0 m above sea level), the electricity supply amount for the heater 5c is increased by an amount corresponding thereto to thereby reduce the fly height.

For a reduction fly height (in the order of nm) per heater-actuating electricity supply amount of 1 mW (fly height reduction efficiency), an average value thereof can be known through design values or sampling test in a laboratory. In addition, when the amplitude of the playback signal waveform is measured while the heater-actuating electricity supply amount is being increased, the respective fly height reduction efficiency for the respective head slider can be obtained from a Wallace spacing loss equation.

Usage of Heater (Temperature)

Compensation for fly height variance associated with the environmental temperature will be described hereinbelow. When the environmental temperature is high, the fly height is reduced due to the effects of thermal protrusion caused due to a difference between the linear expansion coefficients of the recording/playback element material and the peripheral material. In contrast, when the environmental temperature is low, the fly height is increased. According to embodiments of the present invention, in a product, an appropriate heater-actuating electricity supply amount(s) corresponding to an environmental temperature zone(s) is recorded as a single numeric value (coefficient) or a plurality of numeric values (table) in the storage portion 15. The respective value is obtained in accordance with the result of preliminarily investigation of effects of the environmental temperature on the fly height in a laboratory. When a seek command is received from the host, a value in a heater control register of the preamplifier 7 is appropriately updated in accordance with information received from the temperature sensor 9.

Control may be provided in the manner that a range between upper and lower limits of operation guaranteeing temperatures is split into a large number of temperature zones, and all control parameters corresponding to the respective temperature zones are stored. Alternatively, control may be provided in the manner that only control parameters corresponding to a limited number of temperature zones, such as three temperature zones corresponding to a low, normal, and high temperatures are stored, in which ranges thereamong are interpolated through, for example, a primary or secondary expression.

Usage of Heater (Zone)

Compensation for fly height variance associated with a zone of the magnetic disk medium will be described hereinbelow. The fly height is different depending on the zone. As a profile thereof an average profile of the zones can be known through design values or sample tests carried out in a laboratory. Alternatively, in the pre-shipment testing process, the respective profile corresponding to the respective head slider can be obtained through contact detection carried out by gradually increasing the appropriate heater-actuating electricity supply amount corresponding to the respective zone. In the product, per-zone appropriate heater-actuating electricity supply amounts are preliminarily recorded in the form of tables in the storage portion 15. Upon receipt of a seek command from the host, the value in the heater control register of the preamplifier 7 is appropriately updated in accordance with recording/playback zone information.

A method for storing control parameters by splitting the magnetic disk medium 3 into a large number of zones is most accurate. However, a method in which common control parameters for the whole of the magnetic disk medium 3 (that is, the number of zones is only one) may be employed. Alternatively, control may be provided in the manner that control parameters are stored by being separated into a small number of zones, such as three zones corresponding to an outer, in between, and inner circumferential portions, in which ranges thereamong may be controlled by being interpolated through, for example, a primary or secondary expression.

Usage of Heater (Operation Mode)

Compensation for fly height variance associated with an operation mode, such as mode of record or playback operation, will be described hereinbelow. Recording current in the recording operation works similar to heater current to thereby cause thermal expansion deflection, such that the fly height during the record operation is reduced relative to that in the playback operation. The amount of reduction (amount of fly variation associated with write protrusion) can be known through design values or sample tests carried out in a laboratory. Alternatively, in the pre-shipment testing process, the respective amount of fly height variation associated with write protrusion corresponding to the respective head slider can be obtained through a comparison between a playback signal wavelength amplitude immediately after consecutive writes and a playback signal wavelength amplitude not associated with write. In the product, heater-actuating electricity supply amounts for compensation of write protrusion are preliminarily recorded in the storage portion 15. Upon receipt of a pre-recording/playback seek command from the host, the value in the heater control register of the preamplifier 7 is appropriately updated in accordance with operation mode information.

Usage of Heater (Respective Fly Height Variance)

Compensation for fly height variance of the discrete or respective head slider will be described hereinbelow. The fly height is different depending on the respective head slider. In a pre-shipment testing process, when contact detection is carried out by gradually increasing the heater-actuating electricity supply amount on a zone or respective zone, a respective distance (clearance) leading to contact of the respective head slider can be obtained. In the product, values each obtained by subtraction of a reliability margin from the heater-actuating electricity supply amount leading to contact are preliminarily recorded in the storage portion 15 in units of the head. Upon receipt of a pre-recording/playback seek command seek command from the host, the value in the heater control register of the preamplifier 7 is appropriately updated in accordance with recording/playback head number information.

Another method is available in which the clearance respective head slider is not obtained by the contact detection. According to the method, a recording/playback performance examination is carried out for an error rate or the like by eventually increasing the heater-actuating electricity supply amount in a zone or respective zone in a pre-shipment testing process, and an electricity supply amount in the state where a desired value is reached is adopted as a specific electricity supply amount for the corresponding head slider.

In a summary of the heater-actuating electricity supply amount setting methods described above, electricity supply amount tables as shown in FIG. 10 are created and stored in the storage portion 15 before shipment. When a pre-recording/playback seek command is received from the host, the value in the heater control register is appropriately updated in accordance with any one of the recording/playback head number information, temperature zone information output from the temperature sensor 9, operation mode information, and zone information.

An amount of power is added to a respective amount of power in the respective table in correspondence to the output of the air pressure sensor 7f, which is integrated with the preamplifier 7. Specifically, when the air pressure is low, a small amount of power is added; or alternatively, when the air pressure is high, a large amount of power is added. This results in appropriate updating of the value in the heater control register of the preamplifier 7. As the timing of obtaining air pressure information, the information may be obtained every time a recording/playback command is received or at more intermittent time intervals, or only at the time of activation of the magnetic disk drive.

For controlling the heater of the preamplifier 7, three methods, namely, methods for power control, voltage control, and current control, are used. The heater-induced fly height variation is substantially proportional to the power, and is proportional to the square of the voltage or current value. As such, the level of heating of the heater is first calculated based on the power. For the power control, a simple addition operation is sufficient. More specifically, the addition operation is carried out to add together amounts of power respectively corresponding to the fly height variance associated with the environmental temperature, the fly height variance associated with the zone, the fly height variance associated with the operation mode, the fly height variance of the respective head slider, and the fly height variance associated with the air pressure variance. Thereby, the total amount of power is calculated. For calculation by using voltage or current values, it is necessary that the sum of squares of the voltage or current value for compensating for the respective single fly height variance, thereby to obtain the total amount of voltage or current.

Example of Operation of Magnetic Disk Drive

An example of operation of the magnetic disk drive 1 manufactured as described above will be described herebelow with reference to FIGS. 1, 2, and 3. For description, it is contemplated that values (control parameters) for controlling the electricity supply amounts for the heater 5c in the events of recording and playback are preliminarily stored and set in the storage portion 15 in correspondence to the respective heads, temperature zones, and zones.

Upon receipt of a data recording command and recording-targeted data from the host, the HDC 13 outputs the recording-targeted data to the read/write channel 11, and outputs to the motor driver 12 a specification for moving the magnetic head slider 5 to a recording position corresponding to the command. In this event, the control portion 14 obtains information of an environmental temperature in accordance with a signal output from the temperature sensor 9. Then, correspondingly to a temperature zone of the environmental temperature indicated in the obtained information, the control portion 14 obtains a control parameter (control parameter corresponding to the recording event) stored in the storage portion 15. Further, it regulates the control parameter correspondingly to an output of the air pressure sensor 7f. In the event of low pressure, the parameter value is either slightly increased or not increased; or in the event of high pressure, the value is largely increased. The control portion 14 then outputs to the preamplifier 7 a specification for setting the electricity supply amount for the heater 5c to the above-described specified value. In response, the preamplifier 7 supplies the heater 5c with a current supply as the electricity amount corresponding to the specified value. Then, the heater 5c heats the vicinity of the recording/playback elements of the magnetic head slider 5.

Concurrently, the read/write channel 11 outputs to the preamplifier 7 a signal formed by modulation of the recording-targeted data, and the preamplifier 7 amplifies and outputs the signal to the recording element 5a of the magnetic head slider 5. Thereby, the recording-targeted data is recorded onto the magnetic disk medium 3.

Similarly, upon receipt of a data playback command and playback data from the host, the HDC 13 outputs a playback specification in accordance with the playback command to the read/write channel 11, and outputs to the motor driver 12 a specification for moving the magnetic head slider 5 to a playback position corresponding to the command. In this event, the control portion 14 obtains information of an environmental temperature in accordance with a signal output from the temperature sensor 9. Then, correspondingly to a temperature zone of the environmental temperature indicated in the obtained information, the control portion 14 obtains a control parameter (control parameter corresponding to the playback event) stored in the storage portion 15. Further, it regulates the control parameter correspondingly to an output of the air pressure sensor 7f. In the event of low pressure, the parameter value is either slightly increased or not increased; or in the event of high pressure, the value is largely increased. The control portion 14 then outputs to the preamplifier 7 a specification for setting the electricity supply amount for the heater 5c to the above-described specified value. In response, the preamplifier 7 provides to the heater 5c a current supply as an electricity amount corresponding to the specified value. Then, the heater 5c heats the vicinity of the recording/playback elements of the magnetic head slider 5.

Concurrently, the preamplifier 7 amplifies a playback signal output from the playback element 5b of the magnetic head slider 5 and outputs the amplified signal to the read/write channel 11. The read/write channel 11 generates playback data by demodulation of the signal amplified by the preamplifier 7, and outputs the playback data to the HDC 13. The HDC 13 outputs the playback data to the host.

Figure 11:
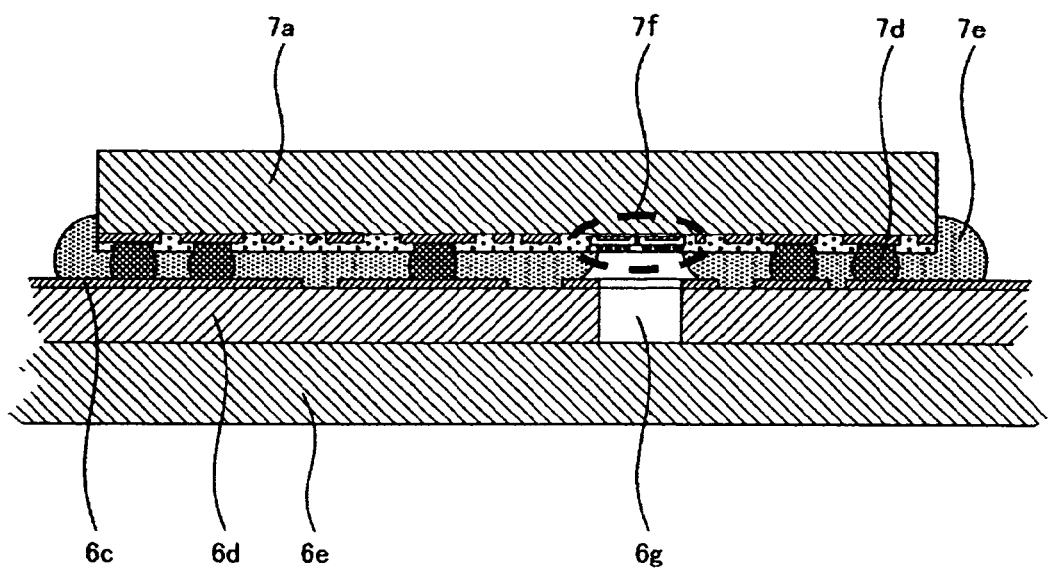
FIG. 11 is a cross sectional view of an assembly of a preamplifier and flexible printed cable of a first modified example.

Modified examples of the preamplifier 7 and the peripheral structure thereof according to above-described embodiment will be described with reference to FIGS. 11 to 13. FIG. 11 shows a first modified example. The example is substantially the same as that of the embodiment shown in FIG. 1. However, as the mechanism for introducing external air pressure into the air pressure sensor 7f, a groove 6g extending perpendicular to the drawing paper surface is used instead of the through-hole 6f. The groove 6g has a length extending further outwardly than an edge of the preamplifier 7. In the present modified example, the groove 6g shown in the drawing has the same thickness as a polyimide resin film 6d of the flexible printed cable 6. However, even a groove having a depth less than the thickness of the polyimide resin film 6d enables obtaining a similar air pressure introduction effect, inasmuch as the depth does not permit entrance of the resin underfill 7e.

Figure 12:
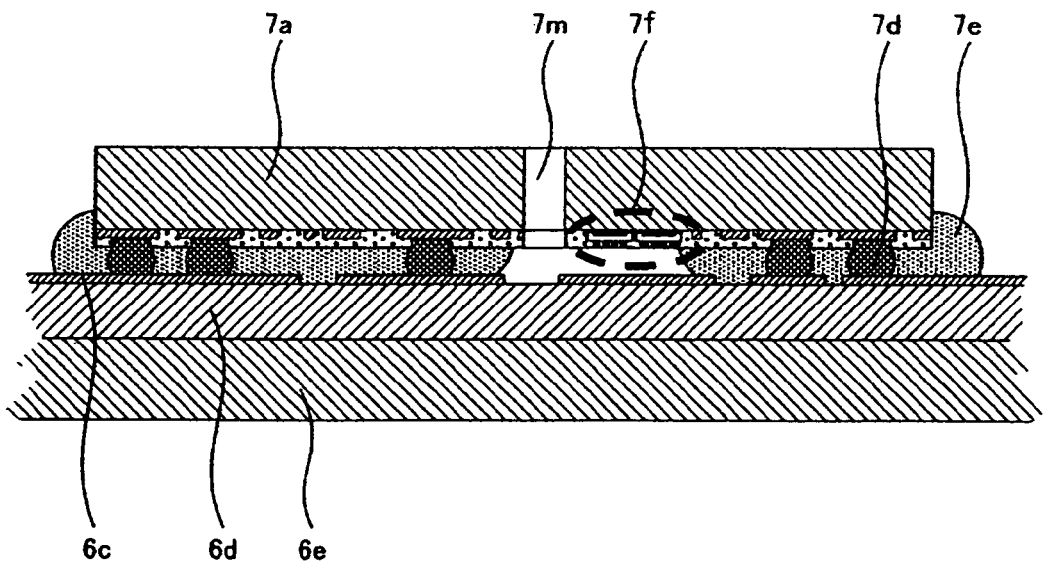
FIG. 12 is a cross sectional view of an assembly of a preamplifier and flexible printed cable of a second modified example.

FIG. 12 shows a second modified example. The example is substantially the same as that of the embodiment shown in FIG. 1. However, as the mechanism for introducing external air pressure into the air pressure sensor 7f, a through-hole 7m is formed in the silicon wafer 7a of the preamplifier 7 instead of the through-hole 6f of the flexible printed cable 6.

Figure 13:
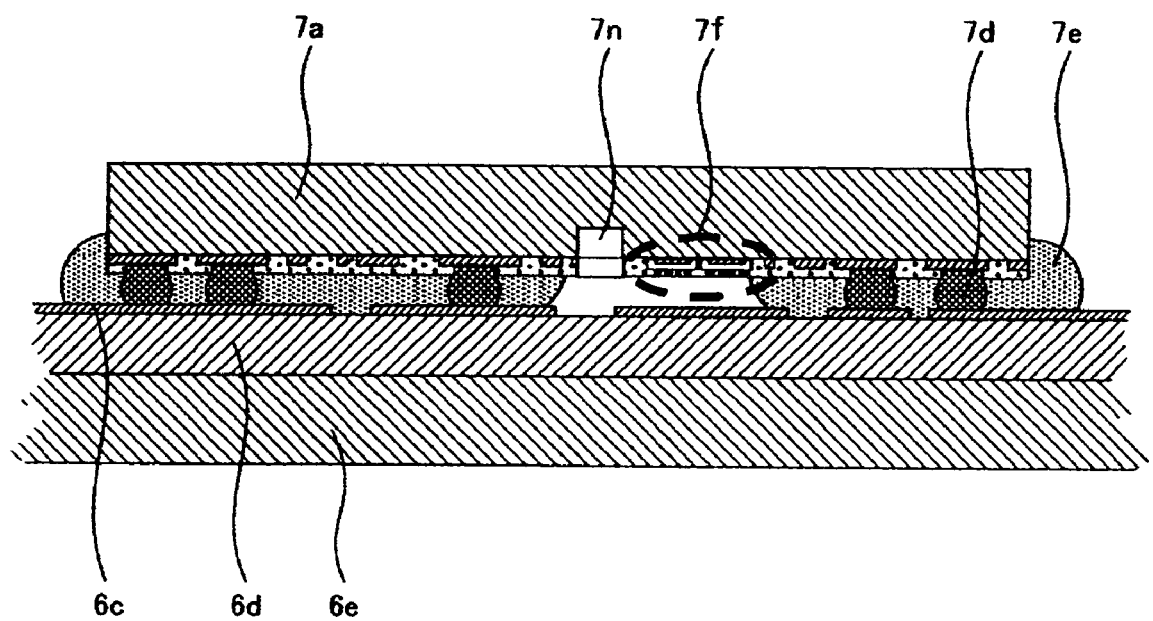
FIG. 13 is a cross sectional view of an assembly of a preamplifier and flexible printed cable of a third modified example.

FIG. 13 shows a third modified example. The example is substantially the same as that of the modified example shown in FIG. 12. However, as the mechanism for introducing external air pressure into the air pressure sensor 7f, a groove 7n has a length extending to reach an end face of the preamplifier 7.

What is claimed is:

1. A magnetic disk drive, comprising:
a magnetic disk medium;
a magnetic head slider including a recording element for recording magnetic information onto the magnetic disk medium, a playback element for playing back magnetic information from the magnetic disk medium, and a heater for regulating a distance between each of the recording and playback elements and the information recording medium;
a carriage assembly for supporting the magnetic head slider and for moving the magnetic disk medium along a radial direction of the magnetic disk medium; and
a preamplifier that amplifies and passes a recording signal to the recording element, that amplifies a playback signal of the playback element, and that supplies a current to the heater, the magnetic disk drive being characterized in that the preamplifier includes an air pressure sensor integrally formed with the preamplifier, and regulates an electricity supply amount for the heater in accordance with an output of the air pressure sensor.

2. The magnetic disk drive according to claim 1, characterized in that the preamplifier includes a plurality of air pressure sensors integrally formed with the preamplifier.

3. The magnetic disk drive according to claim 1, characterized in that the air pressure sensor includes a lower electrode, a diaphragm including an upper electrode formed therein, and an isolated cavity between the lower electrode and the diaphragm.

4. The magnetic disk drive according to claim 1, characterized by further comprising a flexible printed cable that is connected to wirelines to which lead wires of the recording element, the playback element, and the heater and that has one end fixed to the carriage assembly, wherein a plane wherein the air pressure sensor of the preamplifier is formed is attached to the flexible printed cable.

5. The magnetic disk drive according to claim 4, characterized in that the flexible printed cable includes a through-hole in a portion opposite the air pressure sensor.

6. The magnetic disk drive according to claim 4, characterized in that the flexible printed cable includes a groove for introducing an external air pressure to the air pressure sensor.

7. The magnetic disk drive according to claim 4, characterized in that the preamplifier includes a through-hole communicating to the air pressure sensor.

8. The magnetic disk drive according to claim 4, characterized in that the preamplifier includes a groove for introducing an external air pressure to the air pressure sensor.

9. A preamplifier for a magnetic disk drive, wherein an air pressure sensor integrally formed with the preamplifier, the preamplifier being characterized by comprising a write driver for amplifying and supplying a recording signal to a magnetic recording element; a read amplifier for inputting and amplifying a playback signal of a magnetic playback element; a selector that inputs an output signal of the write driver, a playback signal of the magnetic playback element, and an output signal of the air pressure sensor and that selects and outputs any one of the input signals; and an analog-digital converter that converts an analog signal to a digital signal and that outputs the digital signal.

10. The preamplifier for a magnetic disk drive, according to claim 9, characterized in that the air pressure sensor includes a lower electrode, a diaphragm including an upper electrode formed therein, and an isolated cavity between the lower electrode and the diaphragm.

11. A flexible printed cable assembly for a magnetic disk drive, the assembly being characterized by comprising a flexible printed cable including a terminal portion connected to wirelines to which lead wires of a magnetic recording element, a magnetic playback element, and a heater that are mounted in a magnetic head slider; and a preamplifier wherein an air pressure sensor is integrally formed with the preamplifier, and a plane wherein the air pressure sensor of the preamplifier is formed is attached to the flexible printed cable.

12. The flexible printed cable assembly for a magnetic disk drive, according to claim 11, the assembly being characterized in that the flexible printed cable includes a through-hole in a portion opposite the air pressure sensor.

13. The flexible printed cable assembly for a magnetic disk drive, according to claim 11, the assembly being characterized in that the flexible printed cable includes a groove for introducing an external air pressure to the air pressure sensor.

14. The flexible printed cable assembly for a magnetic disk drive, according to claim 11, the assembly being characterized in that the air pressure sensor includes a lower electrode, a diaphragm including an upper electrode formed therein, and an isolated cavity between the lower electrode and the diaphragm.

15. The flexible printed cable assembly for a magnetic disk drive, according to claim 14, the assembly being characterized in that the preamplifier includes a through-hole communicating to the diaphragm of the air pressure sensor.

16. The flexible printed cable assembly for a magnetic disk drive, according to claim 14, the assembly being characterized in that the preamplifier includes a groove for introducing an external air pressure to the diaphragm of the air pressure sensor.

17. The flexible printed cable assembly for a magnetic disk drive, according to claim 11, the assembly being characterized by comprising a write driver for amplifying and supplying a recording signal to a magnetic recording element; a read amplifier for inputting and amplifying a playback signal of a magnetic playback element; a selector that inputs an output signal of the write driver, a playback signal of the magnetic playback element, and an output signal of the air pressure sensor and that selects and outputs any one of the input signals; and an analog-digital converter that converts an analog signal to a digital signal and that outputs the digital signal.

* * * * *